(12) United States Patent
Bianchi et al.

(10) Patent No.: US 10,480,684 B2
(45) Date of Patent: Nov. 19, 2019

(54) SUPPORTING DEVICE, LAYING VESSEL, AND LAUNCH METHOD FOR LAYING A PIPELINE ON THE BED OF A BODY OF WATER

(71) Applicant: SAIPEM S.p.A., San Donato Milanese (IT)

(72) Inventors: Stefano Bianchi, Cernusco Sul Naviglio (IT); Mauro Mottini, Travaco' Siccomario (IT)

(73) Assignee: Saipem S.p.A., San Donato Milanese (IT)

( * ) Notice: Subject to any disclaimer, the term of this patent is extended or adjusted under 35 U.S.C. 154(b) by 267 days.

(21) Appl. No.: 15/522,588

(22) PCT Filed: Nov. 3, 2015

(86) PCT No.: PCT/IB2015/058503
§ 371 (c)(1),
(2) Date: Apr. 27, 2017

(87) PCT Pub. No.: WO2016/071842
PCT Pub. Date: May 12, 2016

(65) Prior Publication Data
US 2017/0363228 A1  Dec. 21, 2017

(30) Foreign Application Priority Data

Nov. 3, 2014  (IT) .............................. MI2014A1881

(51) Int. Cl.
*F16L 1/24* (2006.01)
*F16L 1/16* (2006.01)
(Continued)

(52) U.S. Cl.
CPC .............. *F16L 1/163* (2013.01); *B63B 35/03* (2013.01); *F16L 1/18* (2013.01); *F16L 1/225* (2013.01); *F16L 1/235* (2013.01); *F16L 1/24* (2013.01)

(58) Field of Classification Search
CPC ..... F16L 1/163; F16L 1/18; F16L 1/24; F16L 1/235
USPC ..... 405/166, 167, 171; 441/28, 29; 114/330, 114/331
See application file for complete search history.

(56) References Cited

U.S. PATENT DOCUMENTS 3,472,035 A * 10/1969 Broussard ............... F16L 1/166
405/167
3,517,519 A   6/1970 Kolb et al.
(Continued)

FOREIGN PATENT DOCUMENTS

FR         1290823 A  *  4/1962
WO    WO 2013/186758 A1    12/2013

OTHER PUBLICATIONS

Machine Translation of French document FR 1290823, Apr. 1962, pp. 15.*
(Continued)

*Primary Examiner* — Sunil Singh
(74) *Attorney, Agent, or Firm* — Neal, Gerber & Eisenberg LLP (57) ABSTRACT

A supporting device configured to support a pipeline on the bed of a body of water having a frame connectable in a sliding manner to a pipeline extending along a longitudinal axis between a laying vessel and the bed of a body of water; at least one floating body connected to the frame; and at least one connecting mechanism connecting the frame to the floating body and configured to define a distance between the axis of the pipeline and the floating body, so as to apply a torque to the portion of pipeline at the frame.

36 Claims, 5 Drawing Sheets

(51) Int. Cl.
*F16L 1/225* (2006.01)
*F16L 1/235* (2006.01)
*B63B 35/03* (2006.01)
*F16L 1/18* (2006.01)

(56) References Cited

U.S. PATENT DOCUMENTS

| | | | |
|---|---|---|---|
| 3,559,413 A | | 2/1971 | Silverman |
| 4,121,529 A | * | 10/1978 | Smith .................... F16L 1/163 114/267 |
| 4,127,006 A | | 11/1978 | Oosterkamp |
| 4,145,909 A | * | 3/1979 | Daughtry ................. F16L 1/16 405/168.1 |
| 5,575,590 A | | 11/1996 | Drost et al. |

OTHER PUBLICATIONS

Notification Concerning Submission, Obtention or Transmittal of Priority Document for International Application No. PCT/IB2015/058503 dated Mar. 2, 2016, 1 page.

International Search Report and Written Opinion for International Application No. PCT/IB2015/058503 dated Feb. 19, 2016, 10 pages.

PCT Demand for International Preliminary Examination and Reply to International Search Report and the associated Written Opinion for International Application No. PCT/IB2015/058503 dated Aug. 3, 2016, 8 pages.

Notification of Receipt of Demand by Competent International Preliminary Examining Authority (Form PCT/IPEA/402) for International Application No. PCT/IB2015/058503 dated Sep. 8, 2016, 1 page.

Second Written Opinion of the International Preliminary Examining Authority for International Application No. PCT/IB2015/058503 dated Oct. 10, 2016, 6 pages.

Reply to the Second Written Opinion of the International Searching Authority for International Application No. PCT/IB2015/058503 dated Dec. 12, 2016, 18 pages.

Notification of Transmittal of the International Preliminary Report on Patentability (Form PCT/IPEA/416) for International Application No. International Application No. PCT/IB2015/058503 dated Jan. 18, 2017, 15 pages.

\* cited by examiner

SUPPORTING DEVICE, LAYING VESSEL, AND LAUNCH METHOD FOR LAYING A PIPELINE ON THE BED OF A BODY OF WATER

PRIORITY CLAIM

This application is a national stage application of PCT/IB2015/058503, filed on Nov. 3, 2015, which claims the benefit of and priority to Italian Patent Application No. MI2014A001881, filed on Nov. 3, 2014, the entire contents of which are each incorporated by reference herein.

BACKGROUND

In general, the laying of pipelines on the bed of a body of water is carried out using laying vessels, which are equipped with production lines for constructing the pipelines and laying devices for laying the pipelines on the bed of a body of water. Construction and laying of the pipeline are carried out according to two chief methods, each of which has respective geometrical characteristics that make it preferable to the other depending on the depth of the seabed.

The first method, preferable for deep-water laying, contemplates making a pipeline using a substantially vertical production line and laying the underwater pipeline in a substantially vertical position. Pipelines laid with the first method assume a J-shape in the section extending between the laying vessel and the bed of the body of water, and the method is referred to as J-laying.

The second method, preferable for laying in shallow to medium depth waters, contemplates making the underwater pipeline using a substantially horizontal production line on board the laying vessel and guiding the underwater pipeline along a curved path defined by a supporting structure that extends downstream of the production line and partially into the body of water. Underwater pipelines laid according to the second method assume an S-shape between the laying vessel and the bed of the body of water, and the method is referred to as S-laying. In practice, the laying vessel comprises a floating structure, such as a hull or multihull for example, which houses the production line, and a supporting structure, for example a launch ramp, hinged to the floating structure.

One problem related to laying pipelines on the bed of a body of water consists in the high stresses acting on the pipeline in the launch phase. This problem is intensified by the current trends of laying pipelines of ever increasing size, and at deeper depths. In the case of S-laying, it is technically possible to keep the values of stress on the pipeline under control for the same pulling tension of the tensioners (i.e., the devices assigned to braking and controlling the release of the pipeline from the laying vessel), by increasing the exit angle of the pipeline via rigid supporting structures. However, this technical solution causes high stress on the supporting structure and the floating structure of the laying vessel and therefore requires much larger and stronger supporting structures and, at the same time, large floating structures, with a consequent significant increase in costs.

In the field of underwater pipeline laying, it is known to use support devices for supporting the outboard pipeline. These support devices have the advantage of partially offloading particularly heavy stress on the supporting structure and the floating structure, but induce concentrated shear stress on the pipeline.

In greater detail, U.S. Pat. No. 3,559,413 describes a supporting device comprising floating bodies arranged along the surface of the body of water, and saddles connected to the floating bodies to sustain the span of pipeline.

U.S. Pat. No. 5,575,590 describes a supporting device similar to the previous one, where the saddle is replaced by a clamp provided with a mechanism fitted with rollers that press on the pipeline with pistons operated by the hydrostatic pressure of the body of water. The saddle is connected to a floating body or to a floating pontoon positioned on the surface of the body of water.

U.S. Pat. No. 3,517,519 describes a supporting structure provided with floating bodies immersed in the body of water that enable reducing the stress transmitted from the supporting structure to the laying vessel.

PCT Patent Application No. WO 2013/186758, in the name of the same applicant, describes a laying system for shallow waters comprising a short ramp hinged to a laying vessel; and a laying device equipped with floating bodies immersible in the body of water and connected to a trolley movable along the part of the pipeline extending between the short ramp and the bed of the body of water.

Other types of supporting devices are disclosed in U.S. Pat. Nos. 4,127,006 and 5,576,590.

In the above-indicated documents regarding certain of the known art, the vertical buoyancy force provided by the floating bodies contributes to reducing the stress transmitted from the pipeline to the supporting structure and from the supporting structure to the laying vessel, but progressively loses efficiency as the inclination of the downward spanning portion of the pipeline grows.

SUMMARY

The present disclosure relates to a supporting device configured to lay a pipeline on the bed of a body of water.

The advantage of the present disclosure is to provide a supporting device capable of reducing certain of the drawbacks of certain of the known art.

In accordance with the present disclosure a supporting device is provided for laying a pipeline on the bed of a body of water, the supporting device comprising a frame connectable in a sliding manner to a pipeline extending along a longitudinal axis between a laying vessel and the bed of a body of water; at least one floating body connected to the frame; and at least one connecting mechanism connecting the frame to the floating body and configured to define a certain distance between the axis of the pipeline and the floating body, to apply a torque to the portion of pipeline at the frame wherein the connecting mechanism is of variable geometry, so as to adjust the distance between the axis of the pipeline and the floating body and the amount of torque applied and comprises two arms hinged to the frame and the floating body to form an articulated quadrilateral.

The application of torque to a portion of the pipeline enables relieving the other pipeline supports without generating excessive stress on the pipeline. In addition, the torque can be efficiently applied to substantially vertical or steeply inclined portions of pipeline.

The variable geometry of the connecting mechanism enables modulating the applied torque and to arrange the supporting device in a contracted configuration, particularly advantageous when installing the supporting device on the pipeline.

In particular, the connecting mechanism comprises an actuator configured to selectively adjust the configuration of the connecting mechanism and said distance.

In accordance with the present disclosure, the floating body comprises an adjusting system configured to adjust the buoyancy of the floating body and the amount of torque applied.

The torque applied to the pipeline can also be advantageously modulated by the adjusting system.

In accordance with the present disclosure, the frame comprises clamps movable selectively between an open position and a closed position to release and connect the frame from and to the pipeline respectively.

In particular, the frame comprises rollers fitted to the frame and configured to roll along the pipeline. In this way, it is possible to implement relative motion between the pipeline and the supporting device that includes sliding the pipeline in the laying step and moving the supporting device in the adjusting step.

In accordance with the present disclosure, the supporting device comprises at least one connecting member, such as at least one connecting member located on the frame to connect the supporting device to the laying vessel.

In accordance with the present disclosure, the frame comprises at least one member configured to lock the frame to the pipeline. In this way, the supporting device is advanced together with the pipeline.

In accordance with the present disclosure, the supporting device comprises a control unit on the laying vessel that is configured to control the supporting device. In particular, the control unit is configured to control the adjusting system and/or the configuration of the connecting mechanism based on operational parameters, such as the pulling tension applied to the pipeline for example.

In accordance with the present disclosure, the supporting device comprises an umbilical configured to supply compressed air, pressurized oil and electric power, and transmit signals between the frame and a laying vessel.

A further advantage of the present disclosure is to provide a laying vessel that is devoid of certain of the drawbacks of certain of the known art.

In accordance with the present disclosure, a laying vessel is provided for laying a pipeline on the bed of a body of water, the laying vessel comprising a supporting structure configured to guide a pipeline as the pipeline is launched; and at least one supporting device, which is made with at least the previously described technical characteristics and is located downstream from the supporting structure to apply torque to the pipeline.

According to one embodiment of the present disclosure, the supporting device is hinged to the free end of the supporting structure.

According to a further embodiment of the present disclosure, the supporting device is connected to the laying vessel by a cable that can be wound and unwound to selectively adjust the distance between the supporting device and the supporting structure and laying vessel.

According to another embodiment of the present disclosure, the laying vessel comprises a quantity or number of supporting devices arranged in succession along the pipeline. In this way, it is possible to support the pipeline along a plurality of portions spaced apart from each other.

Another advantage of the present disclosure is to provide a launch method for laying a pipeline on the bed of a body of water capable of reducing certain of the drawbacks of certain of the known art.

In accordance with the present disclosure a laying method is provided for laying a pipeline on the bed of a body of water via a laying vessel, the method comprising the steps of connecting a frame of a supporting device in a sliding manner to a pipeline extending along a longitudinal axis between a laying vessel and the bed of a body of water; supporting the frame via a floating body connected to the frame; and defining a distance between the floating body and the axis of the pipeline via a connecting mechanism of variable geometry comprising two arms hinged to the frame and the floating body to form an articulated quadrilateral between the frame and the floating body, so as to apply a torque to the portion of pipeline at the frame. In this way, it is possible to apply torque even to substantially vertical portions of the pipeline.

Additional features and advantages are described in, and will be apparent from the following Detailed Description and the figures.

BRIEF DESCRIPTION OF THE DRAWINGS

Further characteristics and advantages of the present disclosure will become clear from the description below of certain embodiments, with reference to the figures in the accompanying drawings, in which.

DETAILED DESCRIPTION

Figure 1:
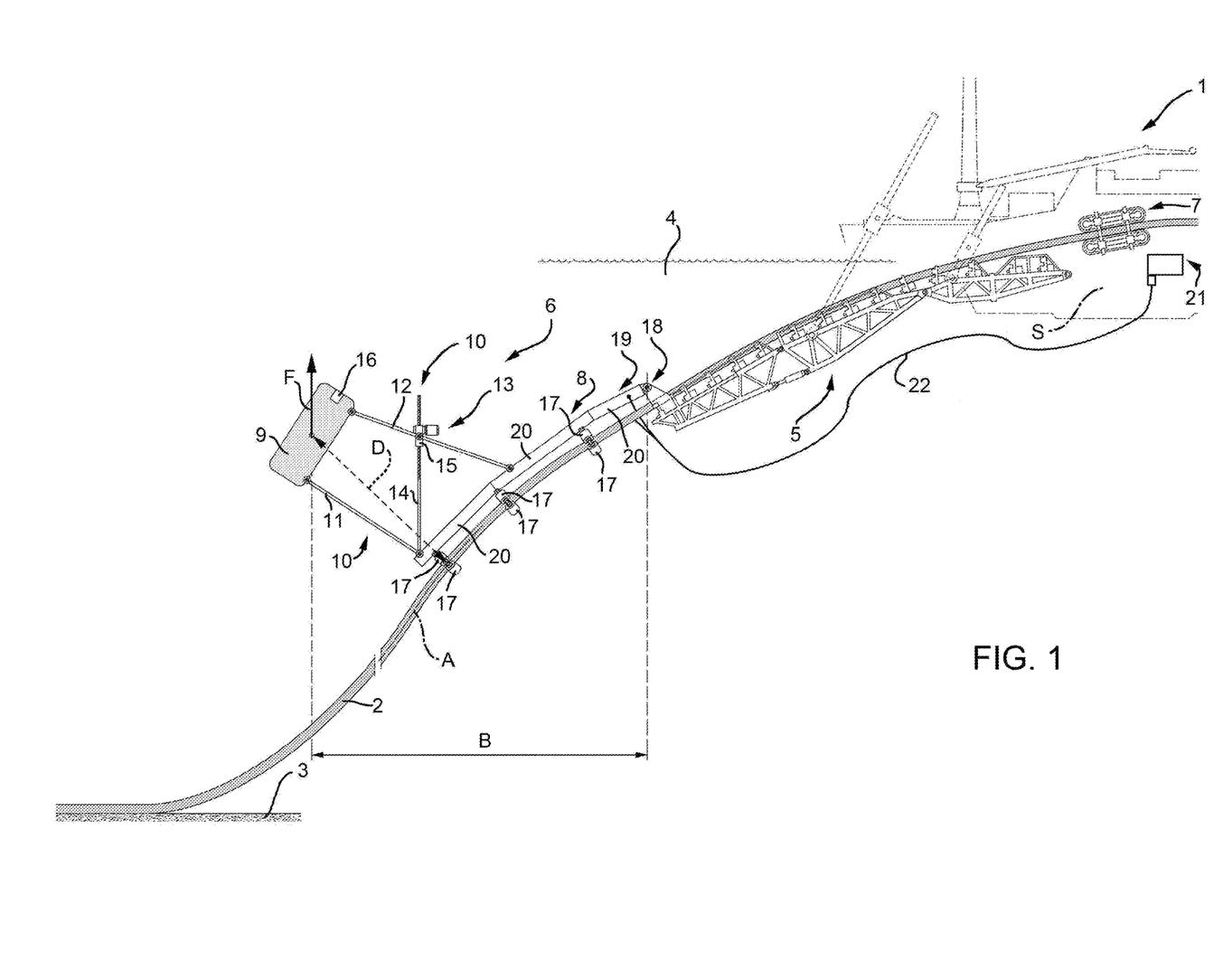
FIG. 1 is a side elevation view, with parts shown schematically and with parts removed for clarity, of a laying vessel equipped with a supporting device according to a first embodiment of the present disclosure.

Referring now to the example embodiments of the present disclosure illustrated in FIGS. 1 to 7, referring to FIG. 1, reference numeral 1 indicates, as a whole, a laying vessel configured to lay a pipeline 2 on the bed 3 of a body of water 4.

The pipeline 2 extends along a longitudinal axis A and is built on board the laying vessel 1 and laid on the bed 3. To launch the pipeline, the laying vessel 1 comprises a floating structure S and a supporting structure 5, in this case a launch ramp, hinged to the floating structure S; a supporting device 6; and tensioners 7 connected to the pipeline 2 to release the pipeline 2 in a controlled manner from the floating structure S. The supporting structure 5 has the function of guiding the pipeline 2 along a curved path, such as having a variable configuration to adjust the exit angle of the pipeline 2 from the supporting structure 5 according to the depth of the bed 3 of the body of water 4.

The supporting device 6 comprises a frame 8 connectable in a sliding manner to a portion of pipeline 2 extending along longitudinal axis A and between the laying vessel 1 and the bed 3 of the body of water 4; a floating body 9 connected to the frame 8; and a connecting mechanism 10, which connects the frame 8 to the floating body 9, and is configured to define a distance D between the longitudinal axis A of the pipeline 2 and the floating body 9 such that the frame 8 applies a torque to the portion of pipeline 2 at the frame 8.

The connecting mechanism 10 has variable geometry so as to adjust the distance D between the longitudinal axis A of the pipeline 2 and the floating body 9. In the case shown, the connecting mechanism 10 comprises two arms 11 and 12 hinged to the frame 8 and to the floating body 9 to form an articulated quadrilateral.

The supporting device 6 comprises an actuator 13 configured to adjust the configuration of the connecting mechanism 10 and distance D. In the case shown, the actuator 13 comprises a threaded rod 14 connected to arm 11 and a motorized nut screw 15 connected to arm 12 and to the threaded rod 14.

The floating body 9 comprises an adjusting system 16 to adjust the buoyancy of the floating body 9. The adjusting system 16 is remotely operated from the laying vessel 1.

The frame 8 comprises rollers 17 fitted to the frame 8 and configured to roll along the pipeline 2.

The supporting device 6 comprises a connecting member 18 arranged at one end of the frame 8. In the case shown, the frame 8 is hinged to the free end of the supporting structure 5 by the connecting member 18 such that the supporting device 6 supports the pipeline 2 when the pipeline is released from the supporting structure 5. In the case shown, the frame 8 comprises an elongated body 19 that supports the rollers 17 arranged around the pipeline 2 to create a sliding coupling between the frame 8 and the pipeline 2.

Referring to FIG. 1, the supporting device 6 comprises a control unit 21 located on the floating structure S to control the actuator 13 used to adjust the configuration of the connecting mechanism 10 and the adjusting system 16 on the basis of values of pulling tension applied to the pipeline 2 and detected at the tensioners 7. The control unit 21 is connected to the frame 8 by an umbilical 22, which is configured to transfer signals and power to the actuator 13 and adjusting system 16.

In use, the pipeline 2 is progressively released by the tensioners 7 and slides on the supporting structure 5 and along the supporting device 6 hinged to the supporting structure 5. The supporting device 6 applies torque to the pipeline 2 in the body of water 4. The amount of torque applied to the pipeline 2 is based on the buoyancy force F provided by the floating body 9 and on an arm B between the floating body 9 (i.e., the point of application of the buoyancy force F) and the point of connection between the supporting device 6 and the supporting structure 5. The reaction to the buoyancy force F takes place more or less at this point of connection.

In the case shown, the arm B is a function of the distance between the floating body 9 and the axis A of the pipeline 2 and the inclination of the pipeline 2.

Figure 2:
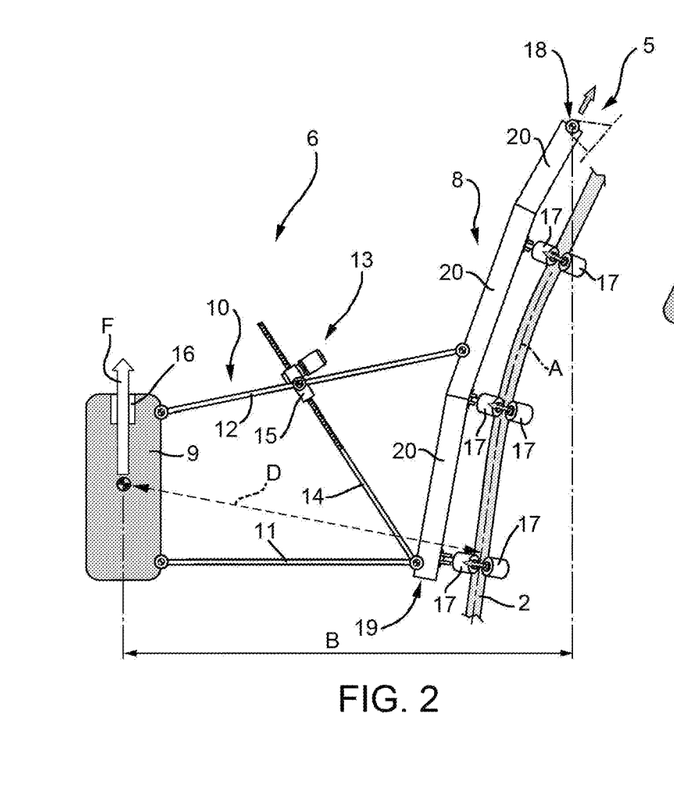
FIGS. 2 and 3 are side elevation views, on an enlarged scale and with parts removed for clarity, of the supporting device in FIG. 1 in two operating configurations.

Referring to FIG. 2, when the pipeline 2 is steeply inclined and has an inclination close to 80°, the inclination of the pipeline marginally contributes to the definition of the arm B.

Figure 3:
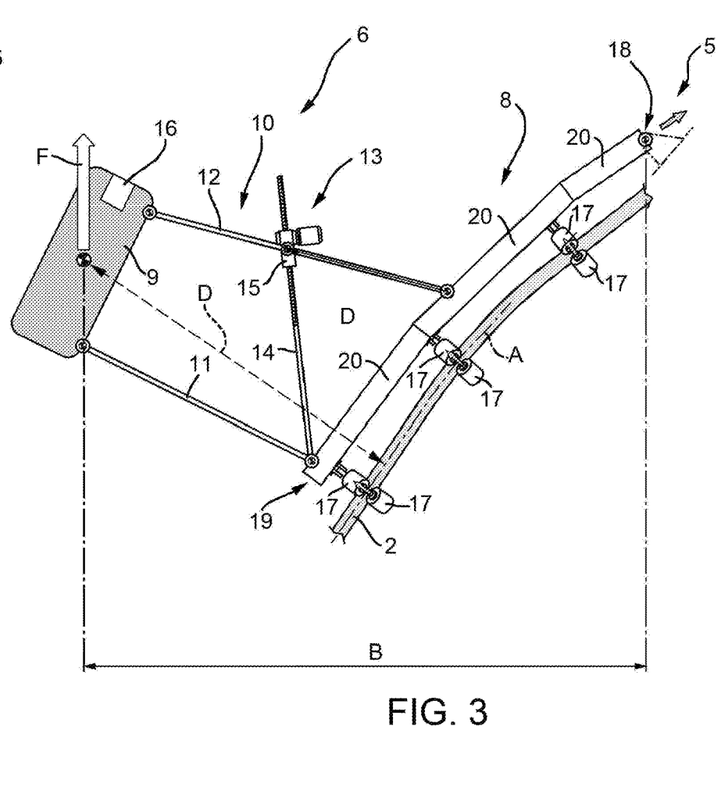

In the case when the pipeline 2 has a configuration such as depicted in FIG. 3 (i.e., an inclination close to 45°), the inclination of the pipeline 2 contributes to determining the arm B by the same amount as the distance D between the floating body 9 and the axis A of the pipeline 2.

Referring to FIG. 1, the applied torque can be modulated both by modulating the buoyancy force F of the floating body 9, and by varying the arm B between the floating body 9 and the frame 8. Modulation of the torque is controlled by the control unit 21 on the basis of signals acquired from a control unit 21, in particular the pulling tension detected at the tensioners 7.

Figure 4:
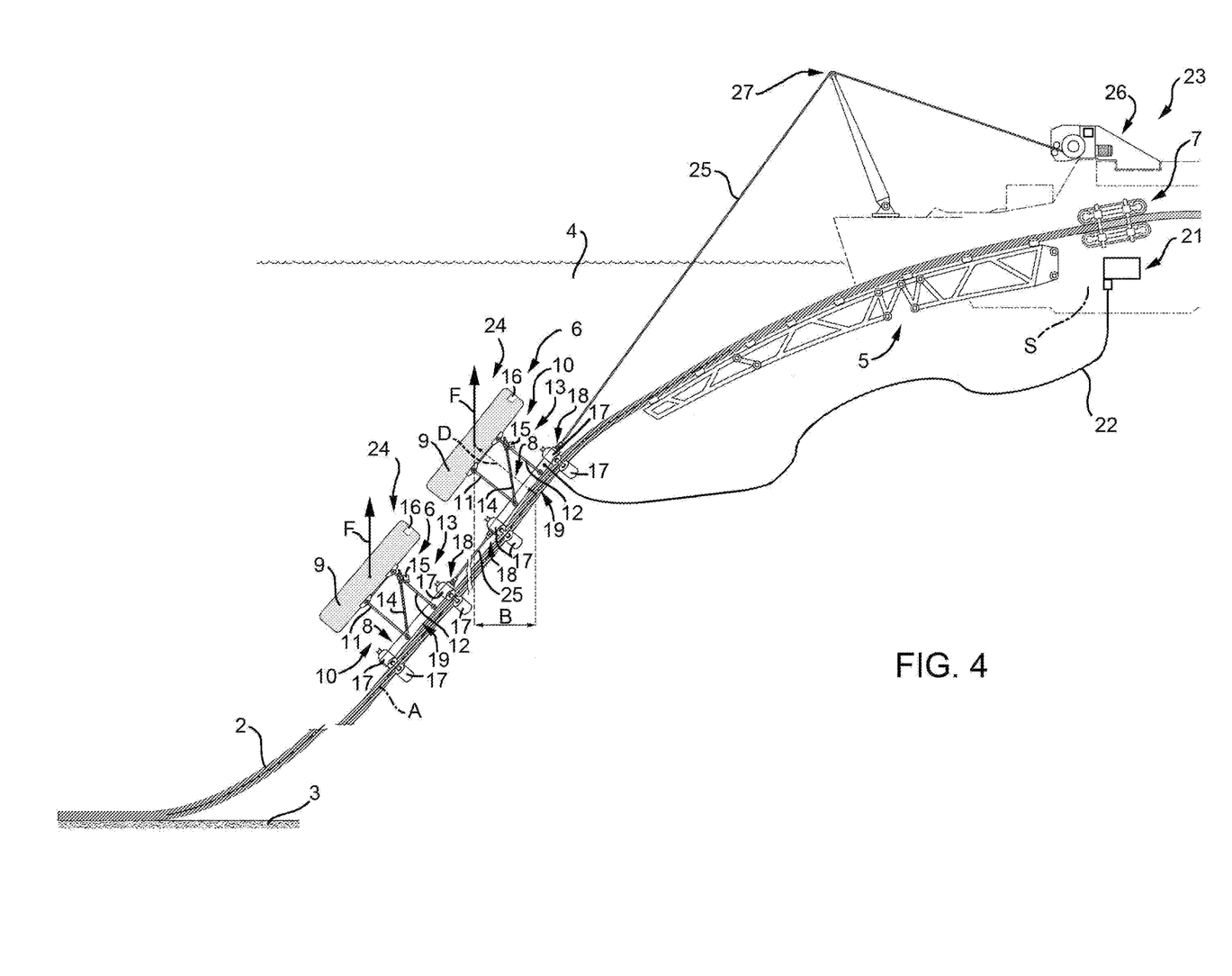
FIG. 4 is a side elevation view, with parts shown schematically and with parts removed for clarity, of a laying vessel equipped with a supporting device according to a second embodiment of the present disclosure.

FIG. 4 shows a laying vessel 23, which is equipped with two supporting devices 24 movable along the pipeline 2. The laying vessel 23 and the supporting devices 24 comprise many structural members previously identified in the embodiment described with reference to FIGS. 1 to 3, and for this reason these structural members will be indicated with the same reference numerals used in the previously described embodiment.

Supporting device 24 differs from supporting device 6 in that it is connected to the laying vessel by a cable 25, which enables placing the supporting device 24 along the pipeline 2 in an optimal position chosen according to the circumstances. To this end, the laying vessel 23 comprises a winch 26 and a pulley device 27 configured to control and guide the cable 25.

From the operational viewpoint, the reaction to the buoyancy force F induced by the floating body 9 is at an intermediate point between two groups of rollers 17. In consequence, the arm B is defined by the distance between the point of application of the buoyancy force F and the reaction to the buoyancy force F.

Also in the case under consideration, the arm B is function of the distance D between the floating body 9 and the axis of the pipeline 2 and of the inclination of the portion of pipeline 2 to which the frame 8 is connected.

Figure 5:
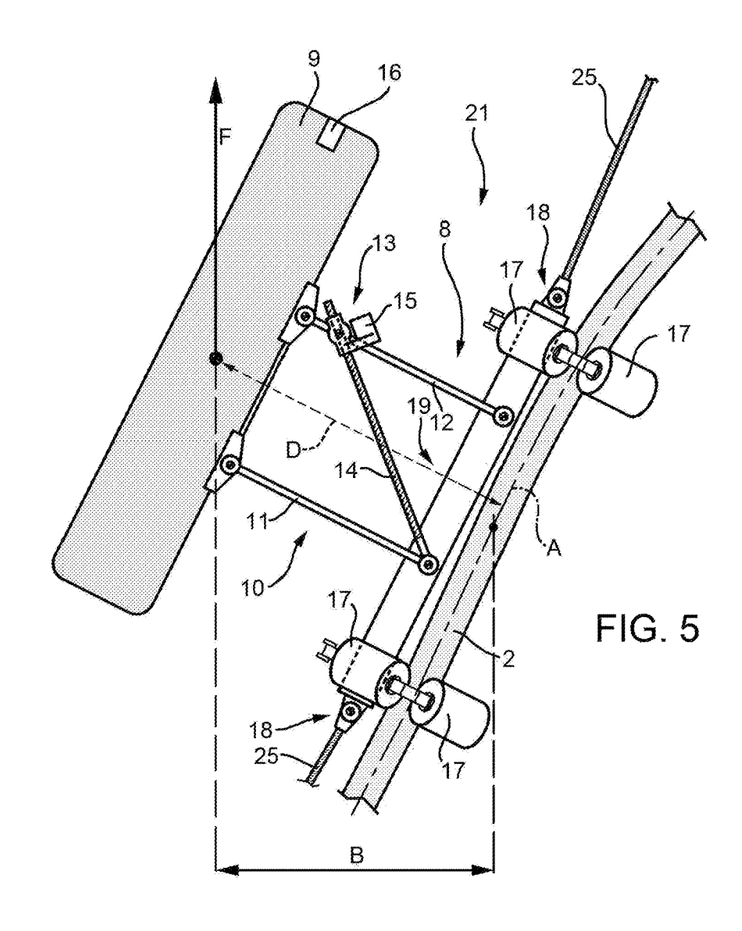
FIGS. 5 and 6 are side elevation views, with parts removed for clarity and on an enlarged scale, of a supporting device made in accordance with the present disclosure.
Figure 6:
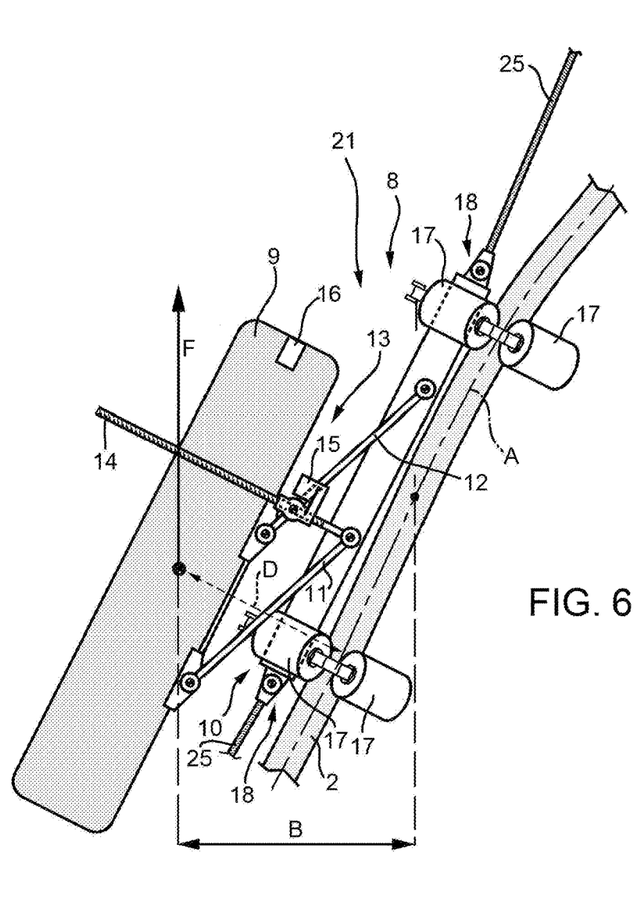

The supporting device 24 is shown in FIG. 5 in an expanded configuration of maximum distance D between the floating body 9 and the axis of the pipeline 2, while in FIG. 6 the supporting device 24 is shown in a contracted configuration of minimum distance D between the floating body 9 and the axis of the pipeline 2. The actuator 13 also enables finely adjusting the distance D between the floating body 9 and the axis of the pipeline in a plurality of intermediate configurations with respect to the extreme ones depicted in FIGS. 4 and 5.

The contracted configuration enables reducing the arm B and, therefore, reducing the torque, while the expanded configuration maximizes the torque. Furthermore, the torque can also be modulated by varying the buoyancy of the floating body 9 via the adjusting system 16. The actuator 13 configured to change the configuration of the supporting device 24 and the adjusting system 16 are remotely controlled from the laying vessel 1 (FIG. 1) on the basis of the values of the pulling tensions applied to the pipeline 2 and detected at the tensioners 7 (FIG. 1) by the control unit 21 (FIG. 1).

The contracted configuration of the supporting device 24 is particularly advantageous also in the phase of installing the supporting device 24, because the contracted configuration provides the supporting device with greater compactness and stability, especially outside of the body of water 4. The supporting device 24 is actually mounted on a portion of the pipeline 2 when this portion of pipeline 2 is still out of the body of water 4.

Referring to FIG. 4, on one end the supporting device 24 is connected by a cable 25 to the laying vessel 23 and on the other end to another supporting device 24 by a cable 25.

Figure 7:
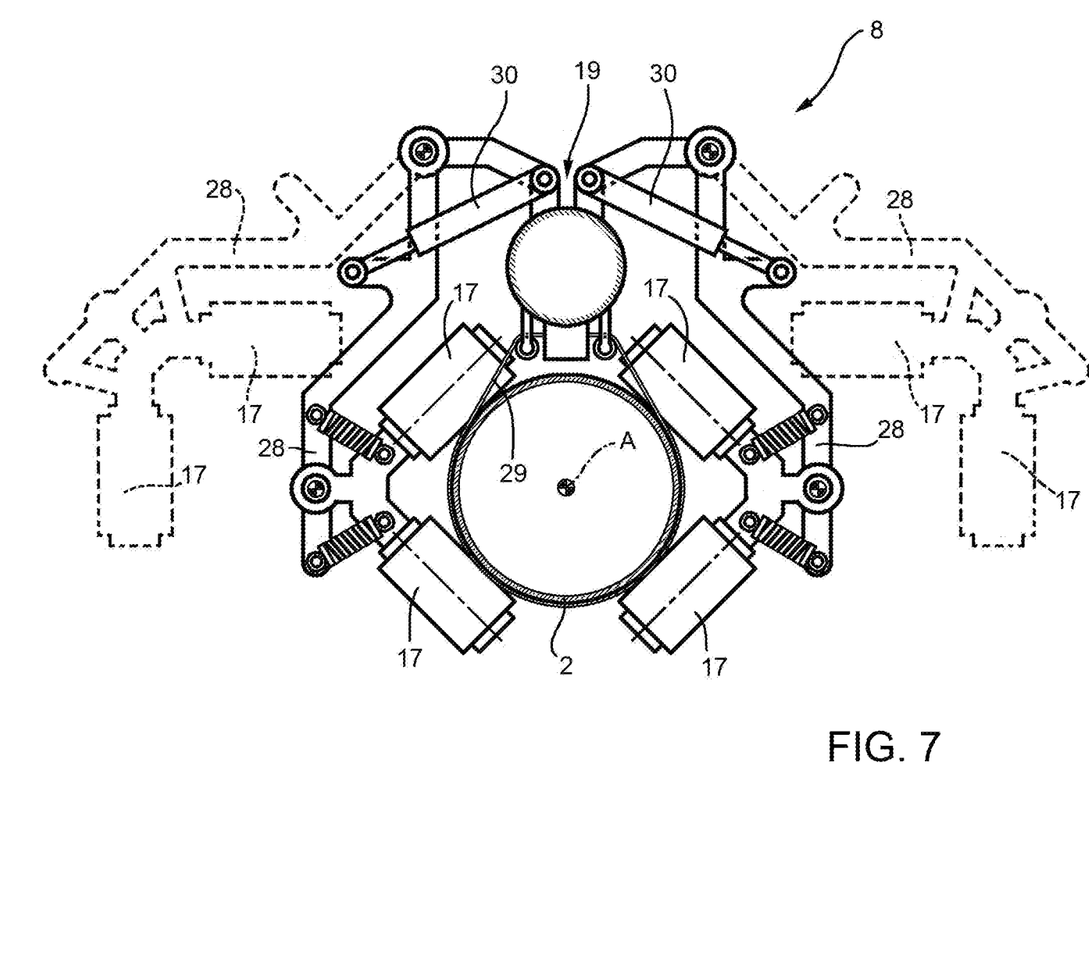
FIG. 7 is an elevation view on a further enlarged scale, with parts removed for clarity and parts in section, of supporting device shown in FIGS. 5 and 6.

Referring to FIG. 7, the frame 8 further comprises an elongated body 19 and rollers 17, clamps 28 on which the rollers 17 are mounted and are movable between a closed position (shown with an unbroken line) and an open position (shown with a broken line).

When the clamps 28 are open, the supporting device 24 is able to transit along the supporting structure 5 (FIG. 4), providing that the supporting device 24 is secured to the pipeline 2 by at least one band 29, which will be disengaged from the pipeline 2 once the clamps 28 have been set in the closed position and the rollers 17 will be in contact with the pipeline 2.

Operation of the clamps 28 is performed by actuators 30 remotely controlled via the control unit 21 and the umbilical 22 (FIG. 4).

Effectively, the supporting device 24 is mounted on a portion of the pipeline 2 via the band 29 and with the clamps 28 open when this portion of pipeline 2 is still out of the body of water 4. This portion of pipeline 2 is fed along the supporting structure 5 (FIG. 4). These operations are facilitated when the supporting device 24 is arranged in the contracted position.

After traversing the supporting structure 5 (FIG. 1), the rollers 17 are arranged in contact with the pipeline 2 and the band 29 unfastened.

Finally, it is evident that variants can be made to the present disclosure with respect to the embodiments described with reference to the accompanying drawings without departing from the scope of the appended claims. Accordingly, various changes and modifications to the presently disclosed embodiments will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A pipeline laying supporting device comprising:
a frame connectable to a pipeline between a laying vessel and a bed of a body of water;
a floating body; and
a connecting mechanism connectable to the frame and to the floating body, said connecting mechanism comprising two arms hingedly attachable to the frame and to the floating body to form an articulated quadrilateral, said connecting mechanism defining a distance between a longitudinal axis of the pipeline and the floating body to apply an amount torque to a portion of the pipeline at the frame, wherein the connecting mechanism comprises an actuator configured to selectively adjust a configuration of the connecting mechanism and said defined distance, and is of a variable geometry such that to adjust the defined distance between the longitudinal axis of the pipeline and the floating body adjusts the amount of torque applied to the portion of the pipeline.

2. The pipeline laying supporting device of claim 1, wherein the floating body comprises an adjusting system configured to adjust a buoyancy of the floating body and the amount of torque applied to the portion of the pipeline.

3. The pipeline laying supporting device of claim 1, wherein the frame comprises a plurality of clamps selectively movable between an open position to release the frame from the pipeline and a closed position to connect the frame to the pipeline.

4. The pipeline laying supporting device of claim 1, wherein the frame comprises a plurality of rollers fitted to the frame and configured to roll along the pipeline.

5. The pipeline laying supporting device of claim 1, wherein the frame comprises at least one connecting member.

6. The pipeline laying supporting device of claim 1, wherein the frame comprises at least one member configured to lock the frame to the pipeline.

7. The pipeline laying supporting device of claim 1, further comprising a control unit on the laying vessel, said control unit configured to control at least one of the floating body and the connecting mechanism.

8. The pipeline laying supporting device of claim 1, further comprising an umbilical configured to:
supply at least one of compressed air, pressurized oil and electric power, and
transmit at least one signal between the frame and the laying vessel.

9. The pipeline laying supporting device of claim 1, wherein the frame is slideably connectable to the pipeline.

10. A pipeline laying supporting device comprising:
a frame connectable to a pipeline between a laying vessel and a bed of a body of water;
a floating body; and
a connecting mechanism comprising:
a first arm comprising a first end pivotably connectable to the frame and a second end pivotably connectable to the floating body,
a second arm comprising a first end pivotably connectable to the frame, and a second end pivotably connectable to the floating body, and
an actuator configured to selectively adjust a geometry of the first arm and the second arm to modify a distance between a longitudinal axis of the pipeline and the floating body, wherein a first distance between the longitudinal axis of the pipeline and the floating body is associated with a first amount of torque applied to a portion of the pipeline and a second, different distance between the longitudinal axis of the pipeline and the floating body is associated with a second, different amount of torque applied to the portion of the pipeline.

11. A pipeline laying vessel comprising:
a supporting structure configured to guide a pipeline as the pipeline is launched; and
a supporting device hinged to a free end of the supporting structure and located downstream from the supporting structure to apply a variable amount torque to a portion of the pipeline, said supporting device comprising:
a frame connectable to the pipeline between the supporting structure and a bed of a body of water;
a floating body; and
a connecting mechanism connectable to the frame and to the floating body, said connecting mechanism comprising two arms hingedly attachable to the frame and to the floating body to form an articulated quadrilateral, said connecting mechanism defining a distance between a longitudinal axis of the pipeline and the floating body to apply the variable amount torque to the portion of the pipeline at the frame, wherein the connecting mechanism is of a variable geometry such that to adjust the defined distance between the longitudinal axis of the pipeline and the floating body adjusts the amount of torque applied to the portion of the pipeline.

12. A method of laying a pipeline on a bed of a body of water, said method comprising:
supporting a frame of a supporting device via a floating body connected to a connecting mechanism of a variable geometry, said connecting mechanism comprising two arms hinged to the frame and to the floating body to form an articulated quadrilateral,
slideably connecting the frame to a pipeline between a laying vessel and the bed of the body of water;
defining a distance between the floating body and a longitudinal axis of the pipeline to apply an amount of torque to a portion of the pipeline.

13. The method of claim 12, further comprising adjusting a configuration of the connecting mechanism to adjust the defined distance between the longitudinal axis of the pipeline and the floating body to adjust the amount of torque applied to the portion of the pipeline.

14. The method of claim 12, further comprising adjusting a configuration of the connecting mechanism based on at least one signal received from a control unit.

15. The method of claim 12, further comprising adjusting a buoyancy of the floating body based on at least one signal received from a control unit.

16. The method of claim 12, further comprising selectively adjusting a position of the supporting device with respect to the laying vessel.

17. The method of claim 12, further comprising arranging a quantity of interconnected supporting devices successively along the pipeline.

18. A pipeline laying supporting device comprising:
a frame connectable to a pipeline between a laying vessel and a bed of a body of water, wherein a plurality of rollers configured to roll along the pipeline are fitted to the frame;
a floating body; and
a connecting mechanism connectable to the frame and to the floating body, said connecting mechanism comprising two arms hingedly attachable to the frame and to the floating body to form an articulated quadrilateral, said connecting mechanism defining a distance between a longitudinal axis of the pipeline and the floating body to apply an amount torque to a portion of the pipeline at the frame, wherein the connecting mechanism is of a variable geometry such that to adjust the defined distance between the longitudinal axis of the pipeline and the floating body adjusts the amount of torque applied to the portion of the pipeline.

19. The pipeline laying supporting device of claim 18, wherein the floating body comprises an adjusting system configured to adjust a buoyancy of the floating body and the amount of torque applied to the portion of the pipeline.

20. The pipeline laying supporting device of claim 18, wherein the frame comprises a plurality of clamps selectively movable between an open position to release the frame from the pipeline and a closed position to connect the frame to the pipeline.

21. The pipeline laying supporting device of claim 18, wherein the frame comprises at least one connecting member.

22. The pipeline laying supporting device of claim 18, wherein the frame comprises at least one member configured to lock the frame to the pipeline.

23. The pipeline laying supporting device of claim 18, further comprising a control unit on the laying vessel, said control unit configured to control at least one of the floating body and the connecting mechanism.

24. The pipeline laying supporting device of claim 18, further comprising an umbilical configured to:
supply at least one of compressed air, pressurized oil and electric power, and
transmit at least one signal between the frame and the laying vessel.

25. The pipeline laying supporting device of claim 18, wherein the frame is slideably connectable to the pipeline.

26. A pipeline laying supporting device comprising:
a frame slideably connectable to a pipeline between a laying vessel and a bed of a body of water;
a floating body; and
a connecting mechanism connectable to the frame and to the floating body, said connecting mechanism comprising two arms hingedly attachable to the frame and to the floating body to form an articulated quadrilateral, said connecting mechanism defining a distance between a longitudinal axis of the pipeline and the floating body to apply an amount torque to a portion of the pipeline at the frame, wherein the connecting mechanism is of a variable geometry such that to adjust the defined distance between the longitudinal axis of the pipeline and the floating body adjusts the amount of torque applied to the portion of the pipeline.

27. The pipeline laying supporting device of claim 26, wherein the floating body comprises an adjusting system configured to adjust a buoyancy of the floating body and the amount of torque applied to the portion of the pipeline.

28. The pipeline laying supporting device of claim 26, wherein the frame comprises a plurality of clamps selectively movable between an open position to release the frame from the pipeline and a closed position to connect the frame to the pipeline.

29. The pipeline laying supporting device of claim 26, wherein the frame comprises a plurality of rollers fitted to the frame and configured to roll along the pipeline.

30. The pipeline laying supporting device of claim 26, wherein the frame comprises at least one connecting member.

31. The pipeline laying supporting device of claim 26, wherein the frame comprises at least one member configured to lock the frame to the pipeline.

32. The pipeline laying supporting device of claim 26, further comprising a control unit on the laying vessel, said control unit configured to control at least one of the floating body and the connecting mechanism.

33. The pipeline laying supporting device of claim 26, further comprising an umbilical configured to:
supply at least one of compressed air, pressurized oil and electric power, and
transmit at least one signal between the frame and the laying vessel.

34. A pipeline laying vessel comprising:
a supporting structure configured to guide a pipeline as the pipeline is launched; and
a supporting device located downstream from the supporting structure to apply a variable amount torque to a portion of the pipeline, said supporting device comprising:
a frame slideably connectable to the pipeline between the supporting structure and a bed of a body of water;
a floating body; and
a connecting mechanism connectable to the frame and to the floating body, said connecting mechanism comprising two arms hingedly attachable to the frame and to the floating body to form an articulated quadrilateral, said connecting mechanism defining a distance between a longitudinal axis of the pipeline and the floating body to apply the variable amount torque to the portion of the pipeline at the frame, wherein the connecting mechanism is of a variable geometry such that to adjust the defined distance between the longitudinal axis of the pipeline and the floating body adjusts the amount of torque applied to the portion of the pipeline.

35. The pipeline laying vessel of claim 34, wherein the supporting device is connected to the laying vessel by a cable configured to be wound and unwound to selectively adjust a distance between the supporting device and the laying vessel.

36. The pipeline laying vessel of claim 35, further comprising a quantity of supporting devices arranged in succession along the pipeline.

* * * * *